(12) United States Patent
Maeda et al.

(10) Patent No.: US 8,661,186 B2
(45) Date of Patent: Feb. 25, 2014

(54) NONVOLATILE MEMORY DEVICE, ACCESS DEVICE, AND NONVOLATILE MEMORY SYSTEM

(75) Inventors: Takuji Maeda, Osaka (JP); Toshiyuki Honda, Kyoto (JP); Masahiro Nakanishi, Kyoto (JP); Tadashi Ono, Osaka (JP); Tatsuya Adachi, Osaka (JP); Isao Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 662 days.

(21) Appl. No.: 12/374,672

(22) PCT Filed: Jul. 26, 2007

(86) PCT No.: PCT/JP2007/064674
§ 371 (c)(1),
(2), (4) Date: Mar. 19, 2009

(87) PCT Pub. No.: WO2008/013227
PCT Pub. Date: Jan. 31, 2008

(65) Prior Publication Data
US 2010/0005226 A1    Jan. 7, 2010

(30) Foreign Application Priority Data

Jul. 26, 2006  (JP) ................................ 2006-203537

(51) Int. Cl.
*G11C 16/10* (2006.01)
*G06F 12/02* (2006.01)
*G06F 3/06* (2006.01)

(52) U.S. Cl.
USPC ................. 711/103; 711/154; 711/E12.008; 710/60; 707/822; 707/E17.01

(58) Field of Classification Search
None
See application file for complete search history.

(56) References Cited

U.S. PATENT DOCUMENTS

| | | | |
|---|---|---|---|
| 4,910,706 A | * | 3/1990 | Hyatt .............................. 365/45 |
| 5,335,117 A | | 8/1994 | Park et al. |

(Continued)

FOREIGN PATENT DOCUMENTS

| | | |
|---|---|---|
| JP | 5-282800 A | 10/1993 |
| JP | 9-319645 A | 12/1997 |

(Continued)

OTHER PUBLICATIONS

English language Abstract of JP 2006-178923 A.

(Continued)

*Primary Examiner* — Reginald G. Bragdon
*Assistant Examiner* — Daniel Bernard
(74) *Attorney, Agent, or Firm* — Greenblum & Bernstein, P.L.C.

(57) ABSTRACT

An access device 100 includes an access speed information part 112 for informing an access speed required for data recording by the access device 100 to a nonvolatile memory device 200. The nonvolatile memory device includes an access condition determination part 212 for determining an access condition required for meeting the informed access speed and an access area determination unit 213 for determining an access area according to the determined access condition. The access device 100 informs the required access speed to the nonvolatile memory device 200 in advance so that the access condition determination part 212 and the access area determination part 213 in the nonvolatile memory device 200 realize data recording which meets the access speed informed in advance upon the data recording. Thus, it is possible to access all the nonvolatile memory devices at a desired speed regardless of difference in characteristics of the recording speed of each of the nonvolatile memory devices.

16 Claims, 13 Drawing Sheets

| Nonvolatile memory management unit | 4 M B | |
|---|---|---|
| | Data amount | Recording speed |
| Recording speed corresponding to data amount | 4 M B | 4 M B / s |
| | 3 M B | 2.6 M B / s |
| | 2 M B | 1.6 M B / s |
| | 1 M B | 0.7 M B / s |
| | 512 k B | 0.3 M B / s |
| | 256 k B | 0.2 M B / s |
| | 128 k B | 0.1 M B / s |

(56) References Cited

U.S. PATENT DOCUMENTS

| | | | |
|---|---|---|---|
| 5,509,126 A * | 4/1996 | Oprescu et al. | 710/106 |
| 5,944,792 A * | 8/1999 | Yamato et al. | 709/219 |
| 6,006,303 A * | 12/1999 | Barnaby et al. | 711/151 |
| 6,189,080 B1 * | 2/2001 | Ofer | 711/167 |
| 6,189,081 B1 | 2/2001 | Fujio | |
| 6,223,221 B1 * | 4/2001 | Kunz | 709/224 |
| 6,321,260 B1 * | 11/2001 | Takeuchi et al. | 709/223 |
| 6,378,031 B1 * | 4/2002 | Kuno et al. | 711/4 |
| 6,438,086 B1 | 8/2002 | Haneda | |
| 6,442,661 B1 * | 8/2002 | Dreszer | 711/170 |
| 6,609,167 B1 * | 8/2003 | Bastiani et al. | 710/104 |
| 6,771,575 B1 * | 8/2004 | Park et al. | 369/47.14 |
| 7,277,825 B1 * | 10/2007 | Orfali et al. | 702/186 |
| 7,298,730 B2 * | 11/2007 | Wu | 714/748 |
| 2001/0029537 A1 * | 10/2001 | Klein | 709/224 |
| 2002/0030694 A1 * | 3/2002 | Ebihara et al. | 345/634 |
| 2002/0118696 A1 * | 8/2002 | Suda | 370/432 |
| 2002/0133612 A1 * | 9/2002 | Depelteau | 709/232 |
| 2002/0136137 A1 * | 9/2002 | Shishido et al. | 369/59.25 |
| 2003/0048677 A1 * | 3/2003 | Muneno | 365/200 |
| 2003/0081938 A1 * | 5/2003 | Nishimura et al. | 386/52 |
| 2003/0189947 A1 * | 10/2003 | Beshai | 370/428 |
| 2004/0068590 A1 * | 4/2004 | Nishino et al. | 710/52 |
| 2004/0107327 A1 * | 6/2004 | Takahashi et al. | 711/170 |
| 2004/0208096 A1 * | 10/2004 | Urazoe | 369/47.32 |
| 2004/0268038 A1 * | 12/2004 | Nagasoe et al. | 711/114 |
| 2005/0144372 A1 * | 6/2005 | Walker | 711/105 |
| 2005/0235098 A1 | 10/2005 | Tamura et al. | |
| 2006/0004969 A1 * | 1/2006 | Suda | 711/154 |
| 2006/0168398 A1 * | 7/2006 | Cadaret | 711/114 |
| 2006/0282617 A1 * | 12/2006 | Nagasoe et al. | 711/114 |
| 2007/0112890 A1 * | 5/2007 | Murase | 707/204 |
| 2007/0168321 A1 * | 7/2007 | Saito et al. | 707/2 |
| 2007/0250475 A1 * | 10/2007 | Idei et al. | 707/2 |
| 2009/0034379 A1 * | 2/2009 | Ueda et al. | 369/47.14 |
| 2010/0274933 A1 * | 10/2010 | Wang | 711/154 |

FOREIGN PATENT DOCUMENTS

| | | | | |
|---|---|---|---|---|
| JP | H11-234614 A | * | 8/1999 | H04N 5/85 |
| JP | 2000-122917 A | | 4/2000 | |
| JP | 2003-098956 A | * | 4/2003 | G09B 29/00 |
| JP | 2005-222201 A | | 8/2005 | |
| JP | 2006-178923 A | | 7/2006 | |
| WO | 2005/008499 A | | 1/2005 | |
| WO | 2005/015406 A1 | | 2/2005 | |
| WO | 2005/071549 A1 | | 8/2005 | |

OTHER PUBLICATIONS

English language Abstract of JP 2005-222201 A.
English language Abstract of JP 2000-122917 A.
English language Abstract of JP 9-319645 A.
English language Abstract of JP 5-282800 A.
U.S. Appl. No. 11/909,311 to Honda, filed Sep. 21, 2007.
U.S. Appl. No. 11/912,700 to Honda et al., filed Oct. 26, 2007.
U.S. Appl. No. 11/993,631 to Inoue et al., filed Dec. 21, 2007.
U.S. Appl. No. 11/995,600 to Honda et al., filed May 23, 2008.

* cited by examiner

F I G. 2
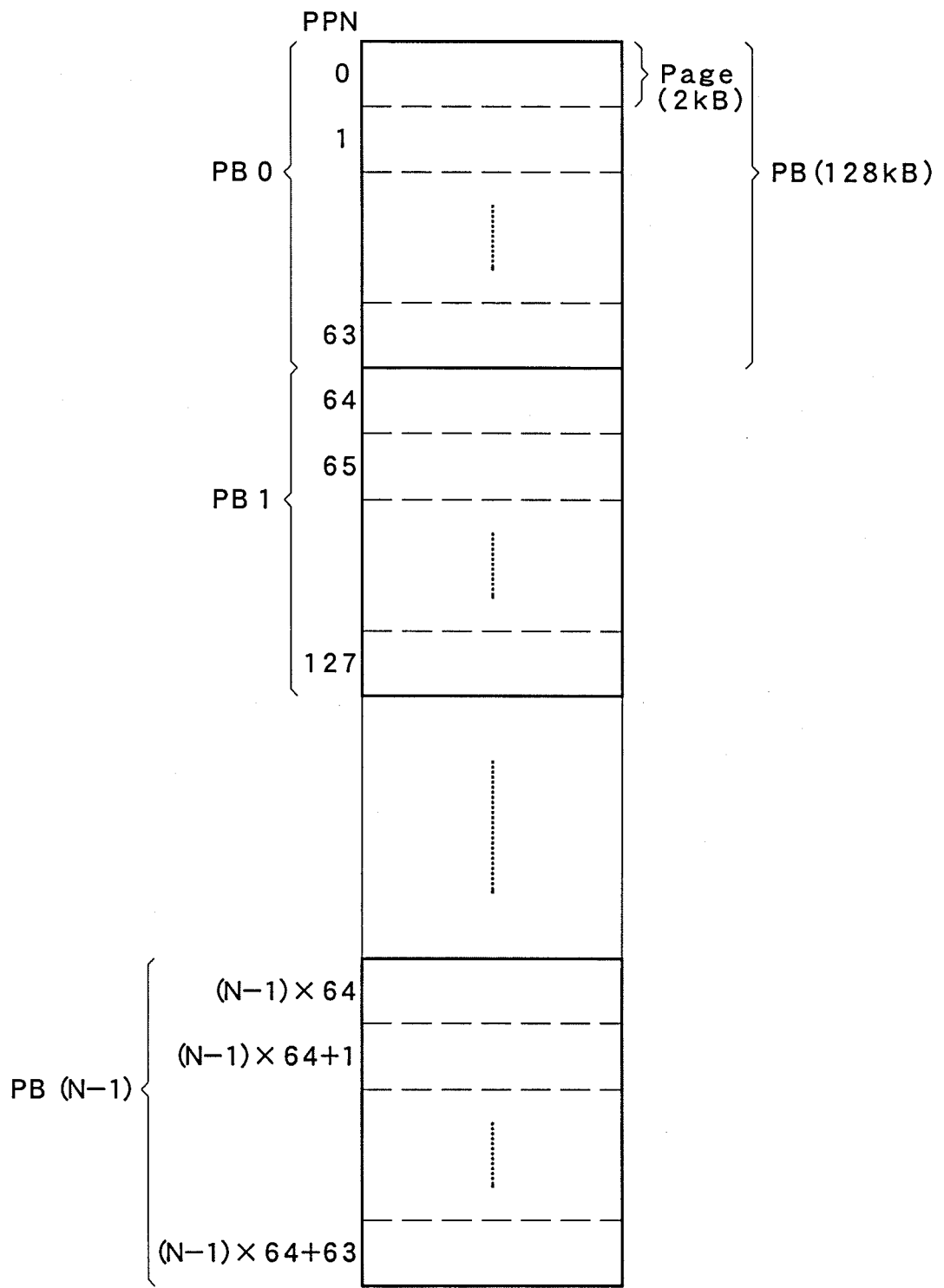

FIG. 3

| Nonvolatile memory management unit | | 4MB |
|---|---|---|
| Recording speed corresponding to data amount | Data amount | Recording speed |
| | 4MB | 4MB/s |
| | 3MB | 2.6MB/s |
| | 2MB | 1.6MB/s |
| | 1MB | 0.7MB/s |
| | 512kB | 0.3MB/s |
| | 256kB | 0.2MB/s |
| | 128kB | 0.1MB/s |

FIG. 4

| Physical page number | Logical address | status |
|---|---|---|
| 0 | 0 | in use |
| 1 | 1 | in use |
| 2 | 4 | in use |
| 3 | NA | unused |
| 4 | NA | unused |
| 5 | 5 | in use |
| ⋮ | ⋮ | ⋮ |

FIG. 7A

| MU 0 | MU 1 | MU 2 | MU 3 | MU 4 |
|---|---|---|---|---|
| 0 | 2048 | Erased | 4096 | Erased |
| 1 | 2049 | Erased | 4097 | Erased |
| 2 | 2050 | Erased | 4098 | Erased |
| 3 | 2051 | Erased | 4099 | Erased |
| 2045 | 4093 | Erased | 6141 | Erased |
| 2046 | 4094 | Erased | 6142 | Erased |
| 2047 | 4095 | Erased | 6143 | Erased |

FIG. 7B

| MU 0 | MU 1 | MU 2 | MU 3 | MU 4 |
|---|---|---|---|---|
| NA | 2048 | 0 | 4096 | Erased |
| NA | 2049 | 1 | 4097 | Erased |
|  | 2050 |  | 4098 | Erased |
| NA | 2051 | 1023 | 4099 | Erased |
| 1024 |  | Erased |  |  |
| 1025 | 4093 | Erased | 6141 | Erased |
|  | 4094 |  | 6142 | Erased |
| 2047 | 4095 | Erased | 6143 | Erased |

F I G. 7 C

| MU 0 | MU 1 | MU 2 | MU 3 | MU 4 |
|------|------|------|------|------|
| NA | NA | 0 | 4096 | Erased |
| NA | NA | 1 | 4097 | Erased |
|  |  |  | 4098 | Erased |
| NA | NA | 1023 | 4099 | Erased |
| 1024 | 3072 | 2048 |  |  |
| 1025 | 3073 | 2049 | 6141 | Erased |
|  |  |  | 6142 | Erased |
| 2047 | 4095 | 3071 | 6143 | Erased |

F I G. 7 D

| MU 0 | MU 1 | MU 2 | MU 3 | MU 4 |
|------|------|------|------|------|
| NA | NA | 0 | 4096 | 1024 |
| NA | NA | 1 | 4097 | 1025 |
|  |  |  | 4098 |  |
| NA | NA | 1023 | 4099 | 2047 |
| 1024 | 3072 | 2048 |  | Erased |
| 1025 | 3073 | 2049 | 6141 | Erased |
|  |  |  | 6142 |  |
| 2047 | 4095 | 3071 | 6143 | Erased |

FIG. 7E

| MU0 | MU1 | MU2 | MU3 | MU4 |
|---|---|---|---|---|
| Erased | NA | 0 | NA | 1024 |
| Erased | NA | 1 | NA | 1025 |
| Erased | ～ | ～ | ～ | ～ |
| Erased | NA | 1023 | NA | 2047 |
| ～ | 3072 | 2048 | 5120 | 4096 |
| Erased | 3073 | 2049 | 5123 | 4097 |
| Erased | ～ | ～ | ～ | ～ |
| Erased | 4095 | 3071 | 6143 | 5119 |

NONVOLATILE MEMORY DEVICE, ACCESS DEVICE, AND NONVOLATILE MEMORY SYSTEM

TECHNICAL FIELD

The present invention relates to a nonvolatile memory device, access device, and nonvolatile memory system which assure, when the access device records data into a recording element in the nonvolatile memory device, a recording speed to the recording element.

BACKGROUND ART

As a recording medium for recording digital data such as music contents and movie data, various types such as a magnetic disk, an optical disk, and a magneto optical disk exist. Among them, a nonvolatile memory device such as a semiconductor memory card is rapidly spreading since the memory device can be miniaturized mainly in a small portable device, for example, a digital still camera and a mobile phone terminal.

The semiconductor memory card mainly uses a semiconductor element called a NAND type flash memory as a recording element. The NAND type flash memory is required to erase data once prior to writing of data. Since processing of erasing is allowed only in units of blocks called a physical block that is an erasing unit, the NAND type flash memory is characterized in that a speed of the writing will be the fastest in a case of writing in units of the physical blocks. The semiconductor memory card does not always have one NAND type flash memory, and there is the semiconductor memory card improving an access performance by using a plurality of the NAND type flash memories and by processing them in parallel. This semiconductor memory card controls the NAND type flash memory with handling a plurality of the physical block as one management unit, and the writing speed will be the fastest in a case of writing in units of the management units. As described above, a recording speed of the semiconductor memory card changes depending on the size of the physical block of used NAND type flash memory, the number of the flash memories, and a unit size of processing in data writing.

Since the physical block size of used NAND type flash memory for a semiconductor memory card and the number of the used NAND type flash memories are different from manufacturer to manufacturer and from generation to generation, the semiconductor memory cards having various characteristics of the recording speed exist in the market. Conventionally proposed has been a method for accessing all semiconductor memory cards in a high speed regardless of the difference of the characteristics of the recording speed different in each of the semiconductor memory cards by retaining information related to the access performance of the semiconductor memory card in the semiconductor memory card and by transferring and receiving, based on the retained information, information related to the recording speed and an optimum access condition between the memory card and the access device (for example, refer to Patent document 1).

Patent document 1: WO2005/015406

DISCLOSURE OF THE INVENTION

Problems to be Solved by the Invention

In the conventional method, an access device determines the recording speed and optimum access condition of the semiconductor memory card based on the information obtained from the semiconductor memory card. Then, the access device records data into the semiconductor memory card in accordance with the access condition, thus a high speed recording into the semiconductor memory card is realized. Here, the access condition includes a size of a processing unit in recording of data into the semiconductor memory card. That is, to realize the high speed recording into the semiconductor memory card, the access device is required to record data of a size according to the size of a processing unit into the semiconductor memory card. On the other hand, a file system such as the FAT file system manages recording area of dada on the semiconductor memory card, and when a file data is recorded into the semiconductor memory card, the file system allocates a free area to the file data and records the data into the area. For this reason, the file system is required to know this size of the processing unit and to allocate free areas consecutive on the logical-physical address, and thus the access device has to install a special file system.

The present invention intends to provide a nonvolatile memory device, access device, and nonvolatile memory system which are able to record data at a high speed into the nonvolatile memory device without requiring a conventionally special file system to the access device side.

Means to Solve the Problems

To solve the problems, a nonvolatile memory device of the present invention comprises: a nonvolatile memory being composed of a plurality of management unit areas of a predetermined size and for storing data; an access condition determination part for determining an access condition including a start position of data management unit and a recording data amount in order to record data at an access speed more than a predetermined speed when data is recorded to said nonvolatile memory; and an access area determination part for determining an area to record data in said nonvolatile memory based on said access condition determined by said access condition determination part.

Said access area determination part determines a physical address of an area to record data based on said access condition, may further comprises: an address conversion control part for converting a logical address that shows a recording position in said nonvolatile memory device and that is given from an access device into a physical address of said nonvolatile tile memory.

The nonvolatile memory device may further comprises: a file system controller for managing data stored in said nonvolatile memory as a file, and said access area determination part, based on said access condition, may determine an area to record data in a recording area in said nonvolatile memory managed by said file system controller.

Said access condition may include minimum data amount recorded in one unit of area management of said nonvolatile memory.

Said predetermined access speed may be an access speed required by an access device when data is recorded to said nonvolatile memory device and may be informed prior to data recording to said nonvolatile memory device.

Said predetermined access speed may be shown as a flag indicating a level of the access speed required when an access device accessing said nonvolatile memory device records data to said nonvolatile memory device, and may be informed from said access device to said nonvolatile memory device prior to data recording to said nonvolatile memory device.

Said predetermined access speed may be shown as time required for a single data recording when an access device accessing said nonvolatile memory device records data to said nonvolatile memory device, and may be informed from said access device to said nonvolatile memory device prior to data recording to said nonvolatile memory device.

Said nonvolatile memory device may be connected to a plurality of access devices accessing said nonvolatile memory device, may be informed of information concerning said predetermined access speed from said one access device among a plurality of said access devices, and may reject an access request from said other access devices while continuing communication to said one access device.

Said nonvolatile memory device may be connected to a plurality of access devices accessing said nonvolatile memory device, may be informed of information concerning said predetermined access speed from said one access device among a plurality of said access devices, and may accept communication with said other access devices while continuing communication to said one access device by either one of handling an access request from said other access devices as data reading only and of not assuring the access speed.

Said nonvolatile memory device may be connected to a plurality of access devices accessing said nonvolatile memory device and may execute at least one data recording in parallel assuring said predetermined access speed informed from a plurality of said access devices within a range of a maximum recording speed or less to said nonvolatile memory of said nonvolatile memory device.

Said access condition determination part may add a limitation that limits a unit of data transmitted and recorded to said nonvolatile memory device to at least a predetermined data size to an access device accessing said nonvolatile memory device.

After said access device informs said nonvolatile memory device of said predetermined access speed, said access device may inform said nonvolatile memory device of said predetermined data size.

The nonvolatile memory device may further comprises: a information storage part for storing access characteristic information including a memory management unit of said nonvolatile memory and a recording speed to data size less than that of the management unit.

To solve the problems, an access device of the present invention which accesses a nonvolatile memory device, comprises: an access speed information part for informing said nonvolatile memory device of an access speed required by said access device when data is recorded to said nonvolatile memory device prior to data recording.

The access device may further comprises: a file system controller for managing data stored in said nonvolatile memory in said nonvolatile memory device as a file.

The access device may transmit access commands for opening, closing, reading, and writing of a file in units of files to the file system controller in said nonvolatile memory device, for managing data stored in said nonvolatile memory in said nonvolatile memory device as a file.

Said access speed notification part may inform said nonvolatile memory device of a flag indicating a level of the access speed required when said access device records data to said nonvolatile memory device prior to data recording to said nonvolatile memory device.

Said access speed notification part may inform said nonvolatile memory device of time that can be taken for a single data recording when said access device records data to said nonvolatile memory device prior to data recording to said nonvolatile memory device.

Said access device may record data at least a predetermined data size required by said nonvolatile memory device to execute the data recording meeting said access speed when data is recorded to said nonvolatile memory device.

To solve the problems, a nonvolatile memory system of the present invention comprises: a nonvolatile memory device having a nonvolatile memory which is composed of a plurality of management unit areas of a predetermined size and which stores data; and an access device which accesses said nonvolatile memory device, wherein said access device includes an access speed information part for informing said nonvolatile memory device of an access speed required by said access device when data is recorded to said nonvolatile memory device prior to data recording.

Said nonvolatile memory device may include: a nonvolatile memory which is composed of a plurality of management unit areas of a predetermined size and which stores data; an access condition determination part for determining an access condition including a start position of data management unit and a recording data amount in order to record data at an access speed more than a predetermined speed when data is recorded to said nonvolatile memory; and an access area determination part for determining an area recording data in said nonvolatile memory based on said access condition determined by said access condition determination part.

Said access area determination part of said nonvolatile memory device may determine a physical address of an area recording data based on said access condition, and said nonvolatile memory device may further comprises: an address conversion control part for converting a logical address that shows a recording position in said nonvolatile memory device and that is given from an access device into a physical address of said nonvolatile memory.

Said nonvolatile memory device may further comprises: a file system controller for managing data stored in said nonvolatile memory as a file, and said access area determination part, based on said access condition, may determine an area for recording data in a recording area in said nonvolatile memory managed by said file system controller.

Effectiveness of the Invention

According to the present invention, data can be recorded at high speed, without installing a special file system on the access device side, into various nonvolatile memory devices having different property of a recording speed.

BRIEF DESCRIPTION OF DRAWINGS

FIG. 2 is an explanation view showing a configuration of a NAND type flash memory according to the embodiment.

FIG. 3 is an explanation view showing one example of access characteristic information in embodiment 1 of the present invention.

FIG. 4 is an explanation view showing one example of a logical-physical address conversion table in embodiment 1 of the present invention.

FIG. 7A is a view showing a change of recorded contents in respective memory management units in the data recording.

FIG. 7B is a view showing a change of recorded contents in the respective memory management units in the data recording.

FIG. 7C is a view showing a change of recorded contents in the respective memory management units in the data recording.

FIG. 7D is a view showing a change of recorded contents in the respective memory management units in the data recording.

FIG. 7E is a view showing a change of recorded contents in the respective memory management units in the data recording.

Figure 1:
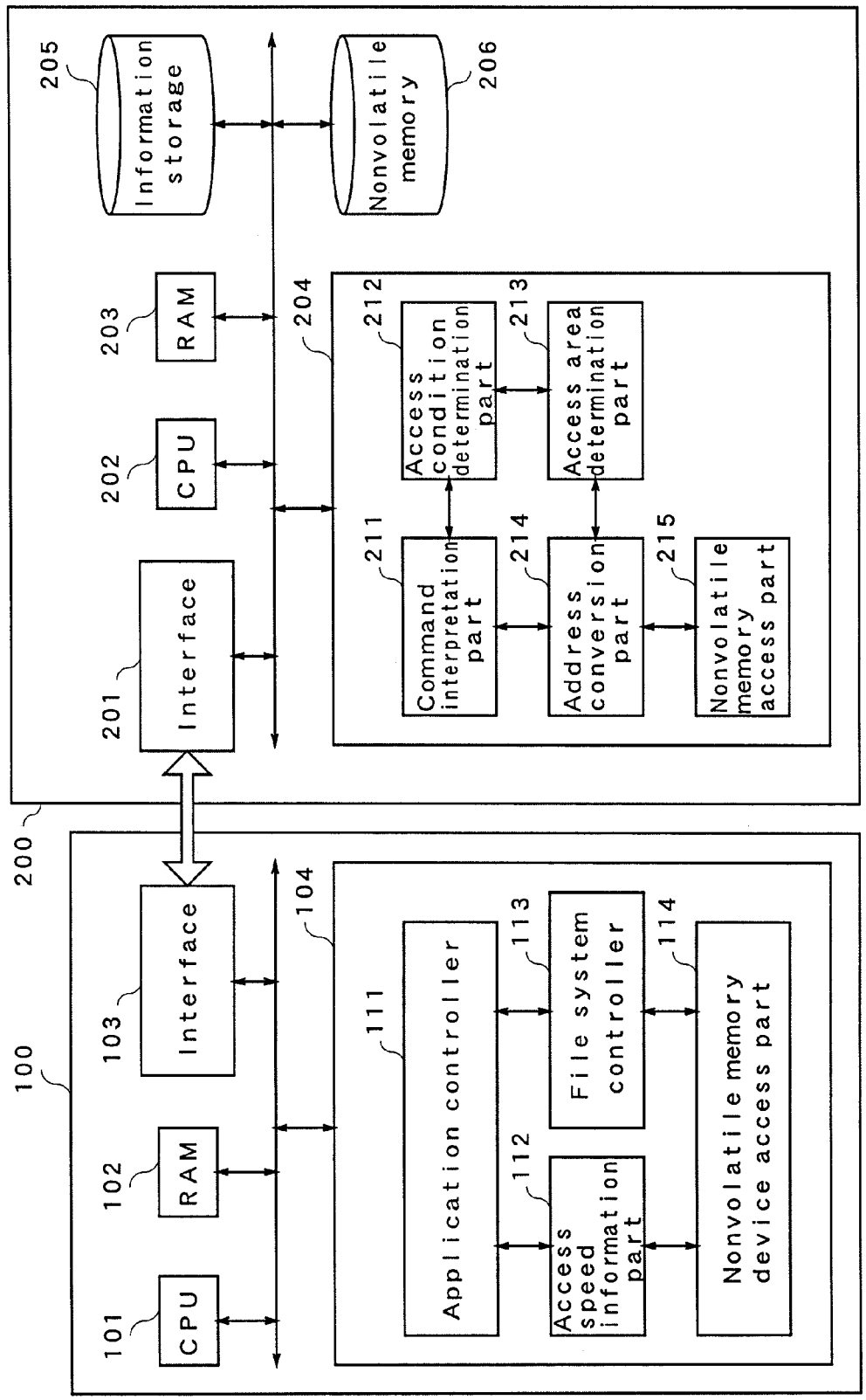
FIG. 1 is an explanation view showing an access device and nonvolatile memory device in embodiment 1 of the present invention.

EXPLANATION FOR REFERENCE NUMERALS 100, 100A, 100B, 100C, 100E Access device
101, 202 CPU
102, 203 RAM
103 Interface
104, 204 ROM
111 Application controller
112 Access speed information part
113, 216 File system controller
114 Nonvolatile memory device access part
200, 200D, 200E Nonvolatile memory device
201 Interface
205 Information storage
206 Nonvolatile memory
211 Command interpretation part
212 Access condition determination part
213 Access area determination part
214 address conversion controller
215 Nonvolatile memory access part
220 Memory controller

BEST MODE FOR CARRYING OUT THE INVENTION (Embodiment 1)

FIG. 1 is a configuration view of an access device and nonvolatile memory device in embodiment 1 of the present invention. In FIG. 1, a nonvolatile memory device 200 is connected to an access device 100. The access device 100 includes a CPU 100, a RAM 102, an interface 103, and a ROM 104.

The interface 103 is a connecting part for connecting the nonvolatile memory device 200 and the access device 100, and a control signal and data are transmitted and received between the access device 100 and the nonvolatile memory device 200 via the interface 103.

The ROM 104 stores programs for controlling the access device 100, and the programs use the RAM 102 as a temporary storage area and run on the CPU 101. The ROM 104 includes programs for an application controller 111, an access speed information part 112, a file system controller 113, and a nonvolatile memory device access part 114.

The application controller 111 totally controls the access device, for example, for generating data and for controlling an electric power source.

The access speed information part 112 notifies, to the nonvolatile memory device 200, an access speed required when the access device 100 records data. The access speed information part 112 only notifies the access speed and does not notify information related to an access condition such as a process unit size.

The file system controller 113 is the same as a file system control part installed in a conventional access device, and performs a control for managing data as the file by using the FAT file system and the like.

The nonvolatile memory device access part 114 controls transmitting and receiving of commands and data to the nonvolatile memory device 200, for example, receiving data with its size and address from the file system controller 113 and recording data of the designated size into a designated position in a recording area of the nonvolatile memory device 200.

On the other hand, in FIG. 1, the nonvolatile memory device 200 includes an interface 201, a CPU 202, a RAM 203, a ROM 204, an information storage 205, and a nonvolatile memory 206.

The interface 201 is an interface for connecting the nonvolatile memory device 200 and the access device 100 and for transmitting and receiving a control signal and data same as in the interface 103.

The ROM 204 stores programs for controlling the nonvolatile memory device 200, and the programs use the RAM 203 as a temporary storage area and run on the CPU 202. The ROM 204 includes programs for a command interpretation part 211, an access condition determination part 212, an access area determination part 213, an address conversion controller 214, and a nonvolatile memory access part 215.

The information storage 205 is a storage part for storing access characteristic information for accessing the nonvolatile memory 206 such as a relationship between the process unit size and a recording speed.

The nonvolatile memory 206 is a nonvolatile memory for storing data transmitted from the access device. The nonvolatile memory 206, for example, employs a NAND type flash memory, and its configuration will be explained based on FIG. 2. In the present embodiment, the nonvolatile memory 206 is composed of N number of physical blocks PB0 to PB(N-1). The physical blocks are erasing units each of which is composed of 64 pages, and a size of the respective pages is 2 kbytes (hereinafter referred to as "MB") and a size of the respective physical blocks is 128 kB. A series of numbers starting from 0 is added to numbers PPN of the physical pages as shown in the figure. Data writing is performed to the NAND type flash memory in units of the pages, and erasing of data in units of the physical blocks is performed prior to data recording.

FIG. 3 shows one example of the access characteristics information stored in the information storage 205. When the NAND type flash memory is used for the nonvolatile memory 206, the information storage 205 stores a nonvolatile memory management unit that is an area management unit managed in an information recording medium and stores recording speeds to each of data amounts as the access characteristics information. This information is necessary because when an amount of recorded data is equal to the management unit or less, the recording speed varies depending on the amount of recorded data.

In the example of FIG. 2, the data writing can be performed in units of the pages (for example, 2 kB), however, the erasing has to be performed in units of the physical blocks. In a case where data of 128 kB is updated, one unused physical block is allocated and new data of 128 kB is recorded into the physical block, and further old data stored in the former physical block is erased. In a case where data of 2 kB in data already written into a physical block is updated, one unused physical block is allocated and new data of 2 kB is recorded into the physical block, the remaining data of 126 kB included in the physical block with a size of 128 kB stored old data of 2 kB is copied to the allocated unused physical block, and the old data of 128 kB stored in the physical block is finally erased. Since data of 128 kB is necessarily recorded in both of the data recording of 128 kB and the data recording of 2 kB alike, the data recording speed of 128 kB can be faster than that in the data recording of 2 kB. The nonvolatile memory device 200 in the present invention stores the characteristics information related to this recording speed into the information storage 205.

In the example of FIG. 3, the nonvolatile memory management unit is set to 4 MB. The nonvolatile memory management unit is a virtual management unit for determining a recording speed to the nonvolatile memory 206, and the management unit is not necessarily the same as the physical block size even in a case of employing the NAND flash memory as a recording device. For example, in a case of a nonvolatile memory device writing data in parallel by using a plurality of flash memories, since the recording speed becomes the fastest when recording data in a size obtained by multiplying the physical block size by the number of flash memories to be used, it can be considered to employ the size as the nonvolatile memory management unit. In the example of FIG. 3, since 16 physical blocks are configured so as to record data in parallel and a size of the respective physical blocks is 128 kB, the top speed of the recording is realized in data recording in units of 4 MB. In a case where a data amount is 4 MB, the recording speed is accordingly set to 4 MB/s. This shows that the recording speed reaches the 4 MB/s in a case where data of 4 MB is recorded into the nonvolatile memory management unit of 4 MB. Similarly, in a case where a data amount is 3 MB, the recording speed is set to 2.6 MB/s. This shows that the recording speed reaches the 2.6 MB/s in a case where data of 3 MB, less than the nonvolatile memory management unit, is recorded. As described above, in the example of FIG. 3, the relationship between an amount of recording data equal to or less than the nonvolatile memory management unit and a recording speed is stored as the access characteristics information.

Next, the programs included in the ROM 204 of the nonvolatile memory device 200 will be explained. The command interpretation part 211 interprets a command transmitted from the access device 100.

Based on the information stored in the information storage 205, the access condition determination part 212 determines an access condition to the nonvolatile memory 206 required to meet the access speed designated by the access device 100. This access condition includes a recording position that is a boundary value for each of the management units of the nonvolatile memory and includes an amount of data to be written in the memory management unit.

The access area determination part 213 determines a physical address at which data is actually recorded when data is recorded on the nonvolatile memory 206 in accordance with the access condition. In this determination, the access area determination part 213 determines a recording area by choosing the memory management unit having, in the memory management unit, a free area equal to or more than a predetermined data amount.

The address conversion controller 214 converts either one of a logical address used in communication with the access device 100 and a physical address on the nonvolatile memory 206 into the other one. FIG. 4 is a view showing the logical-physical conversion table temporarily stored in the RAM 203. This figure shows the logical addresses corresponding to physical page numbers and a use state of the pages. The address conversion controller 214 converts either one of the physical address and the logical address into the other one based on the conversion table, updates this logical-physical conversion table to change a necessary portion when data writing processing finishes, and write the updated table back into the nonvolatile memory 206. This table manages a correspondence relation between the logical address and the physical address (a physical page number) and manages use states of recording areas corresponding to the respective physical addresses. An "NA" in the table represents that a physical address is an unerased page presently released from the correspondence relation with the logical address because the physical address was allocated to a certain logical address at first but then new data is overwritten to the logical address and is stored in another physical address.

Further, the nonvolatile memory access part 215 controls the nonvolatile memory 206.

In the nonvolatile memory device 200 of embodiment 1, when the access device 100 records data, the access area determination part 213 determines a physical address so as to record data into the nonvolatile memory 206 based on an access condition determined in the access condition determination part 212. The address conversion controller 214 converts a logical address into a physical address so as to relate a logical address to which the access device 100 records data with a physical area. According to this, the access device 100 can record data at high speed without being aware of the characteristics of the nonvolatile memory 206.

Figure 5:
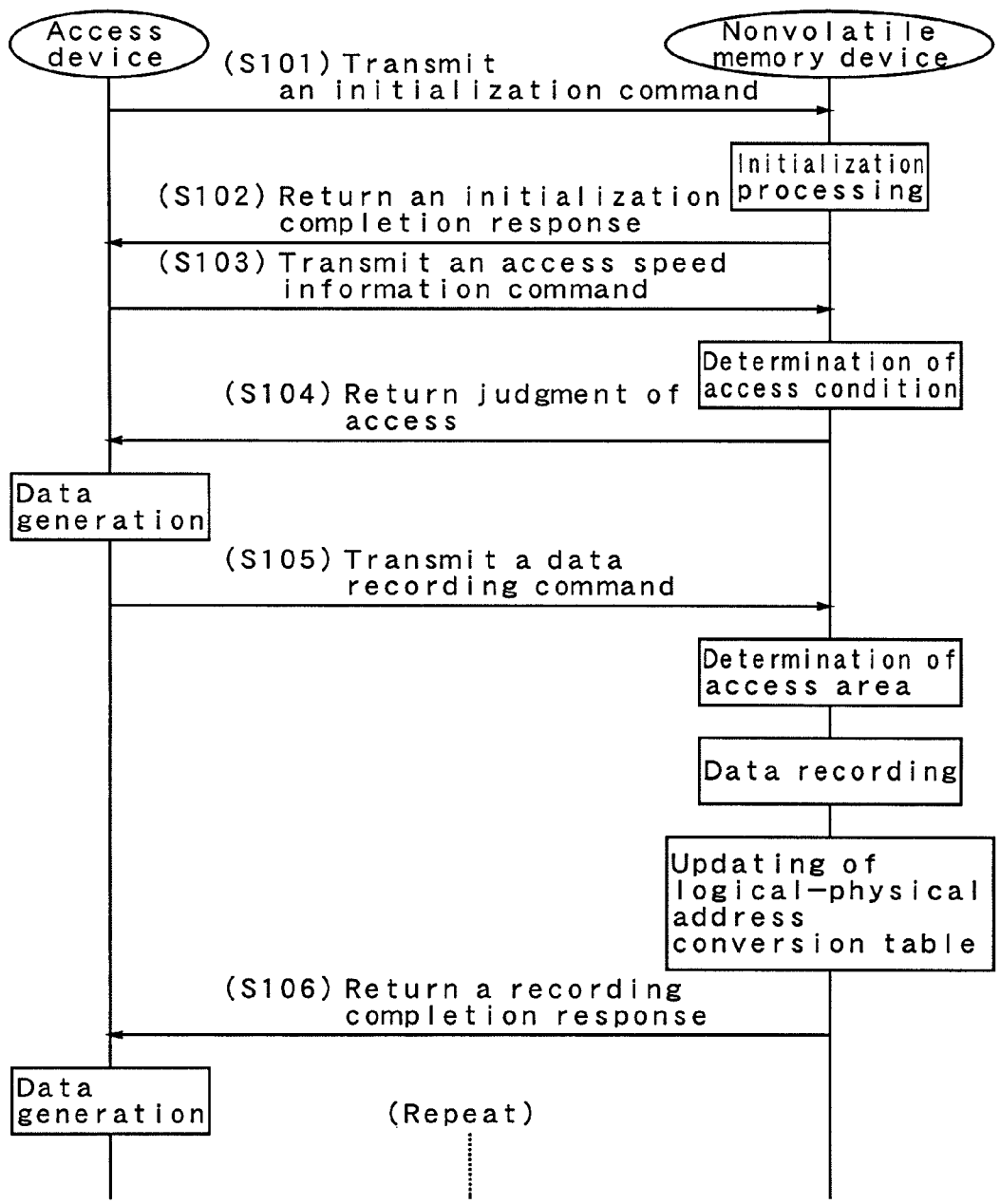
FIG. 5 is a flowchart showing an operational flow in data recording of the access device and nonvolatile memory device in embodiment 1 of the present invention.

Referring to FIG. 5, signal exchanging in data recording between the access device 100 and the nonvolatile memory device 200 in the present embodiment will be explained. In the data recording in the present embodiment, the access device 100 firstly transmits a command for the initialization to the nonvolatile memory device 200 (S101). The nonvolatile memory device 200 that received this initialization command prepares an access to the nonvolatile memory 206, for example, initialization of internally used parameters on the RAM 203 and initialization of the nonvolatile memory 206. When the initializations are completed, the nonvolatile memory device 200 returns a signal to the access device 100 indicating the completion of the initialization (S102).

Next, the access device 100 notifies an access speed required in data recording to the nonvolatile memory device 200 by using the access speed information part 112 (S103). In the notifying this access speed, the access device informs information, for example, "lowest recording speed=1 MB/s" as an argument of a command. Received the access speed notifying command, the nonvolatile memory device 200 determines an access condition meeting the notified access speed (S104) referring to the information storage 205 by the access condition determination part 212 and returns a judgment showing whether it is possible to record with the access speed or not to the access device 100. For example, since a data amount required to meet the "lowest recording speed=1 MB/s" is "2 MB" or more based on the access characteristic information of FIG. 3, this data amount is employed as the access condition. In addition, a recording position at a boundary of 4 MB that is a management unit of the memory is employed as another access condition. On this occasion, the nonvolatile memory device 200 retains the notified access speed and the determined access condition inside.

The access device 100 transmits a data recording command to the nonvolatile memory device 200 after creating data to be recorded to the nonvolatile memory device 200 (S105). This data recording command includes data for transmitting and, for example, a data size and a logical address for recording. Received a data recording command, the nonvolatile memory device 200 obtains an access condition from the access condition determination part 212 by the access area determination part 213 and determines a physical address at which data is actually recorded. As for the access condition, a data amount required to meet the "lowest recording speed=1 MB/s", for example, is 2 MB or more based on the access characteristic information in FIG. 3. Accordingly, when a physical address space is divided in units of "14 MB" of the memory management unit, that is, in units of 2048 pages as the number of pages, the nonvolatile memory device 200 finds out a memory management unit including 1024 numbers of "unused" pages or more which are the page number of "2 MB" and determines a free area in the management unit as a recording area. On this occasion, the nonvolatile memory device 200 uses the logical-physical address conversion table of FIG. 4 in order to search a free area on the physical address space.

Next, the nonvolatile memory device 200 actually records data in the recording area corresponding to a physical address of the free area on the nonvolatile memory 206. In addition, when used pages of less than 1024 pages already exist in the memory management unit, the nonvolatile memory device 200 records data transferred by the access device to a new memory management unit and records the already existing valid data to the new memory management unit.

Then, the address conversion controller 214 updates the logical-address conversion table to allocate a physical address where the data is recorded now to a logical address space specified by the access device 100. When a series of these operations has been completed, the address conversion controller 214 notifies the access device 100 of completion of data recording (S106).

If data to be further recorded remains after that, the processing from the data generation to S106 is repeated until data recording of a necessary amount is completed.

Figure 6:
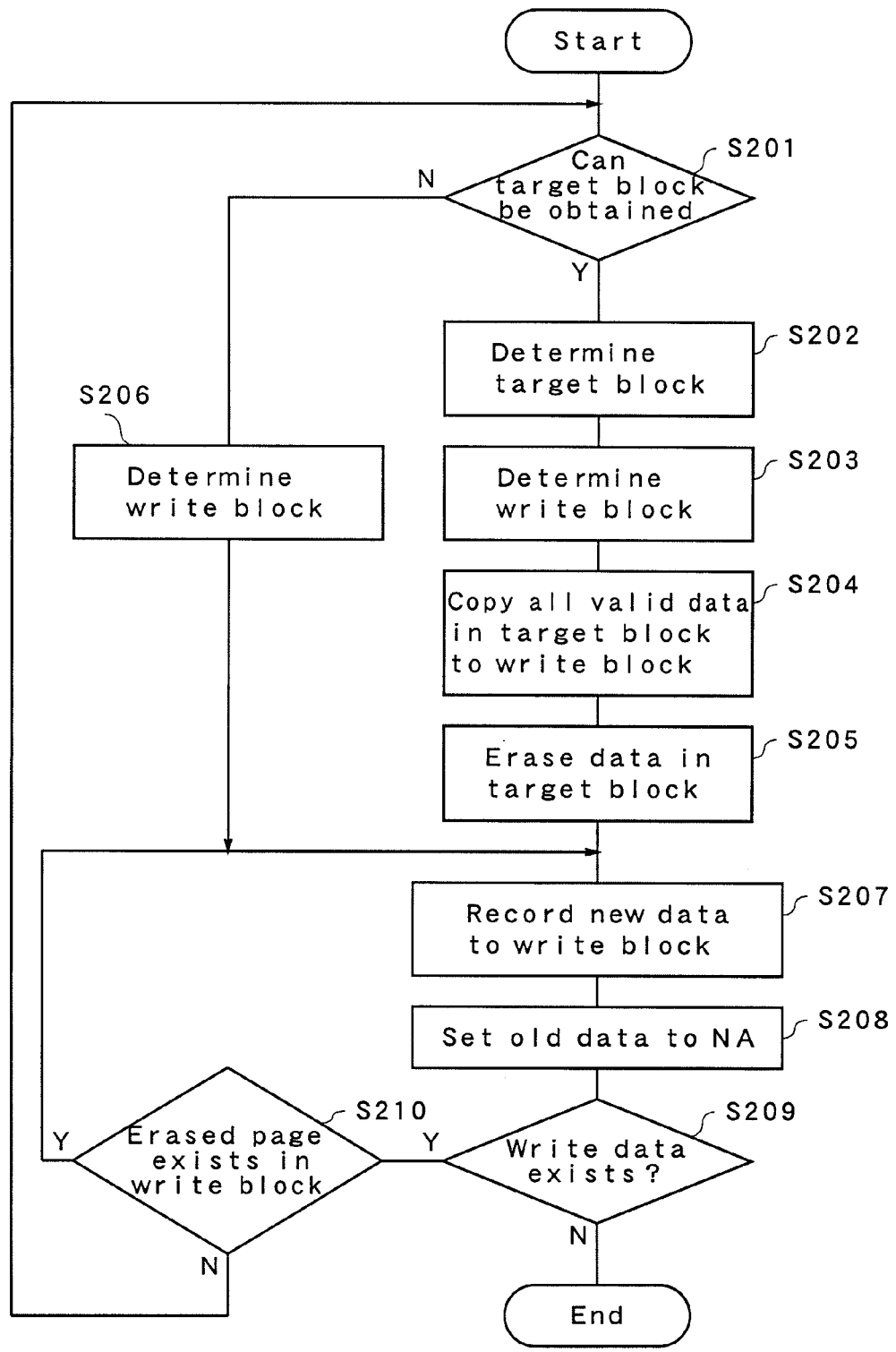
FIG. 6 is a flowchart showing an operation in the data recording in embodiment 1 of the present invention.

An entire flow of the recording will be explained with using FIG. 6. When the writing starts, it is firstly determined at step S201 whether a target block can be obtained or not. The target block is a management unit including the NA pages of 2 MB or more in 4 MB of the memory management unit, and is a block for copying remaining valid data to another memory management unit, setting the all pages to the NA, and setting the unit to a free management unit by erasing them. When it is possible to set the target block, the target block is determined (S202) and then a write block is determined (S203). The write block is one memory management unit to be a writing target selected from the free management units. The free management unit is a memory management unit only composed of erased pages, and at least one free management unit is necessary. When all the free management units are consumed, the processing ends as an error. A region storing the original valid data in the copied target block is set to the NA (S205), then all of valid data in the target block are copied at step S204, and the entire target block is erased. This operation changes the target block into a free management unit. When the target block has not been obtained, only a write block is determined (S206).

After that, new data is recorded in the write block (S207), a logical page address corresponding to a physical page storing old data related to this data is set to the NA (S208). This only changes the corresponding logical address to the NA in the logical-physical conversion table, the page storing old data itself is not erased but stores the old data. And, it is determined at S209 whether data to be written remains or not, and when no data remains, the processing ends. Meanwhile, when the data to be written remains, the processing progresses to S210 and determines whether or not there is an erased page in a write block. When there is the erased page, the processing returns to S207 to repeat the same processing. In addition, when all of the erased pages are consumed, the processing returns to S201 to repeat the same processing.

Referring to FIG. 7A to FIG. 7E, a specific example of this data recording will be explained in more detail. In FIG. 7A, the memory management unit MU0 stores logical pages 0 to 2047, the memory management unit MU1 stores logical pages 2048 to 4095, and the memory management unit MU3 stores logical pages 4096 to 6143, and the memory management units MU2 and MU4 are the free management units where all physical pages are already erased. Descriptions of other memory management units will be omitted. In this state, writing processing where the logical pages 0 to 1023, 2048 to 3071, and 4096 to 5119 are rewritten will be explained as an example.

When the logical pages 0 to 1023 are overwritten, a management unit including the NA page of 2 MB or more in 4 MB is searched. In the state of FIG. 7A, since such management unit does not exist, the progressing proceeds from S201 to S206 and the memory management unit MU2 of a free management unit is set to a write block without determining a target block. After that, logical pages 0 to 1023 of new data are recorded to erased pages in the write block (S207).

As shown in FIG. 7B, corresponding logical addresses of each page in the memory management unit MU0 storing old data related to new data are changed to the NA.

The processing subsequently progresses from step S209 to S210 depending on a command for overwriting the logical pages 2048 to 3071. Then, new data is recorded to erased pages of the memory management unit MU2 (write block) (S207). Corresponding logical addresses of each data in the memory management unit MU1 storing old data related to new data recorded here are changed to the NA (S208). This changes the state to that of FIG. 7C.

Since all erased pages were consumed in the write block even though data to be written remains, the processing returns from S210 to S201 to repeat the processing from the setting a target block. In this case, the memory management unit MU0 is set to a target block at S202. The management unit MU4 of a free management unit is further set to a write block at S203. And, data of the logical pages 1024 to 2047 that is valid data in the target block is copied to the write block at S204. This changes the state to that of FIG. 7D.

According to the copying, each page of the memory management unit MU0 is changed to the NA. When all pages in the target block are set to the NA, data in the target block is erased and all the pages are set to an erased page (S205). Then, new data, that is, the logical pages 4096 to 5119 are written in the erased pages in the write block (S207). The pages of the management unit MU3 storing old data are further set to the NA page in S208. This changes the state to that of FIG. 7E. The same processing is repeated based on a writing command. The logical address and physical address are explained as an address in a page unit, however, an address in another unit may be employed.

As described above, in the access device 100 and the nonvolatile memory device 200 in embodiment 1 of the present invention, the access device 100 preliminarily informs the nonvolatile memory device 200 of a necessary access speed and the nonvolatile memory device 200 realizes data recording at the preliminarily informed access speed in data recording. In this data recording, the access device 100 is not required to perform the recording in accordance with a particular access condition and can perform the data recording with using a conventional file system control part. Accordingly, data can be recorded to the various nonvolatile memory devices 200 having different characteristics of a recording speed at a high speed without installing a special file system to the access device side.

The present invention has been explained based on the above described embodiment, however, it is obvious that the present invention is not limited to the above described embodiment. The present embodiment can be changed without departing from the scope of the present invention. The embodiment of the present invention has explained the case of using the NAND type flash memory as the nonvolatile memory 206, however, a hard disk, an optical disk, or another media may used as the nonvolatile memory 206.

In addition, the example where the access speed information part 112 informs the nonvolatile memory device 200 of information of the lowest recording speed as the argument of a command in processing at S103 was explained, however, the information may be informed to the nonvolatile memory device 200 in another form if the information indicates an access speed. For example, it may be an average recording speed in stead of the lowest recording speed, and combined information of them may be informed to the nonvolatile memory device 200. Furthermore, when speed levels of N steps are preliminarily determined, flags (1 to N) indicating its level may be informed without using the speed itself. Maximum allowable delay time from one transfer of a data recording command to a response reception may be additionally informed to the nonvolatile memory device 200.

Figure 8:
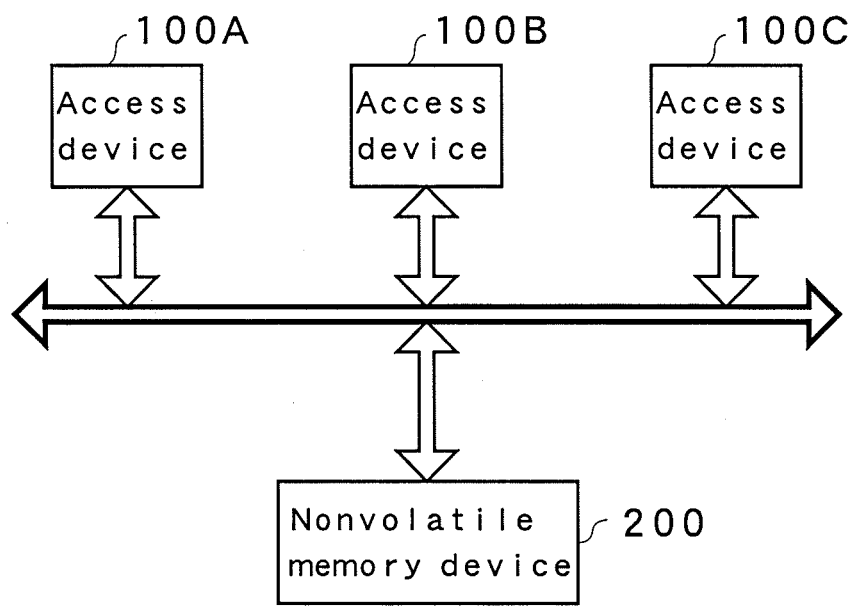
FIG. 8 is an explanation view showing a configuration example of the access device and nonvolatile memory device in embodiment 1 of the present invention.
Figure 9:
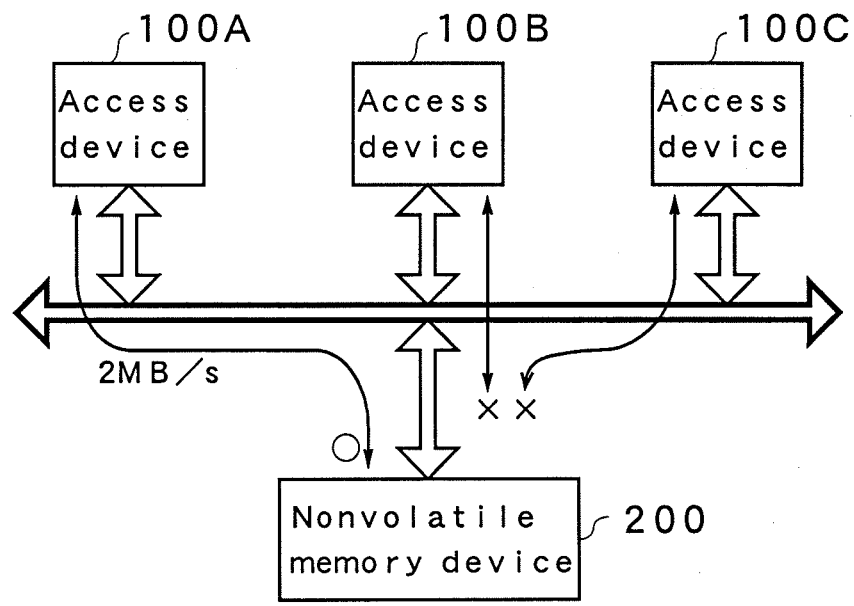
FIG. 9 is a flowchart showing one example of a connection assuring an access speed of the access device and nonvolatile memory device in embodiment 1 of the present invention.
Figure 10:
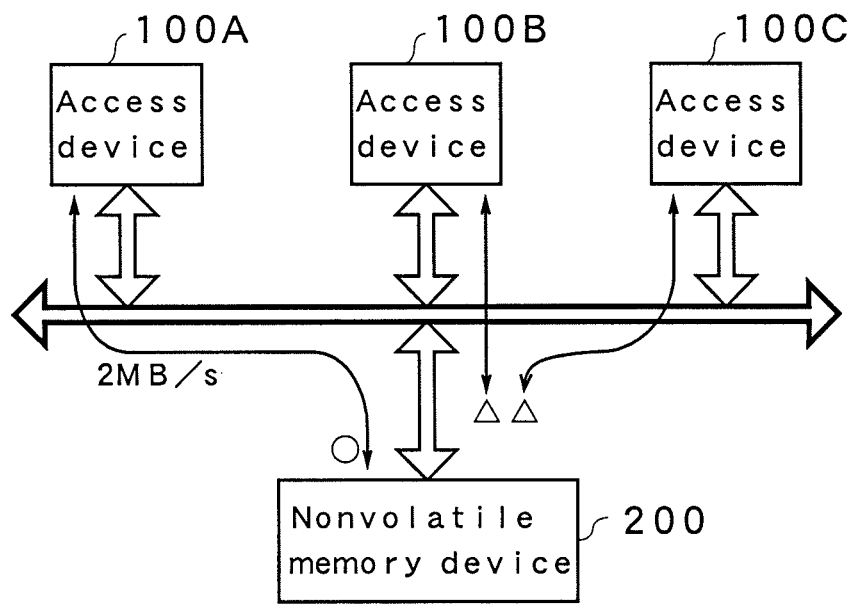
FIG. 10 is a flowchart showing one example of a connection assuring an access speed of the access device and nonvolatile memory device in embodiment 1 of the present invention.

Explained in the embodiment of the present invention was an example where the access device 100 and the nonvolatile memory device 200 are connected each other in one-to-one state, however, the present invention may also be applied to a case where a plurality of the access devices 100A, 100B, and 100C are connected to the single nonvolatile memory device 200 as shown in FIG. 8. In this case, once the nonvolatile memory device 200 starts a connection to the access device 100A as shown in FIG. 9, when the access device 100B and access device 100C access to the nonvolatile memory device 200, the nonvolatile memory device 200 may reject their accesses in order to ensure the access speed. In addition, after starting a connection to the access device 100A as shown in FIG. 10, the nonvolatile memory device 200 may connect to the other access device 100B and access device 100C under a certain additional condition. It can be considered as the certain condition that the connection is handled as data reading only and that the connection is realized without assurance of an access speed.

Figure 11:
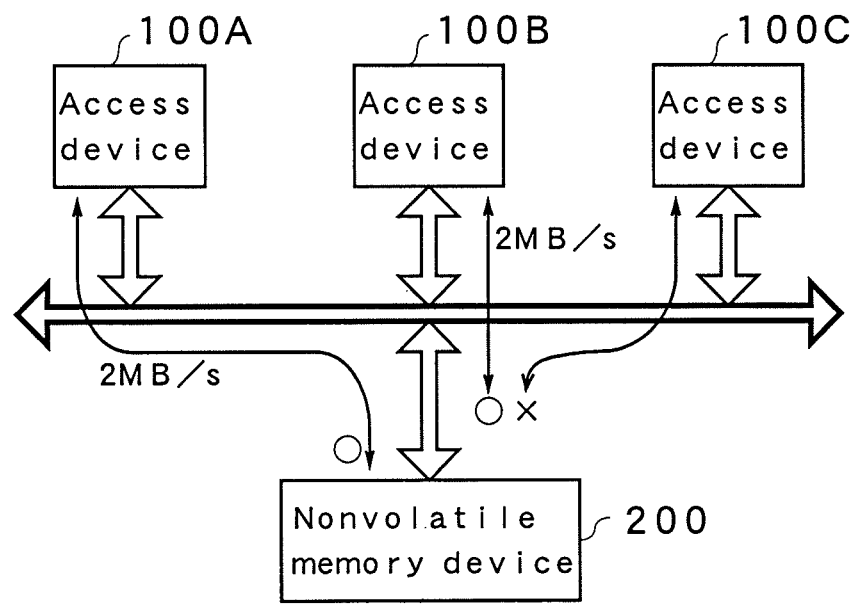
FIG. 11 is a flowchart showing one example of a connection assuring an access speed of the access device and nonvolatile memory device in embodiment 1 of the present invention.

In a case where the nonvolatile memory device 200 can assure an access speed of 4 MB/s as shown in FIG. 11, when the access device 100A connects to the memory device at an access speed of 2 MB/s, the nonvolatile memory device 200 may accept another connection with other access devices under a connection of an access speed of remaining 2 MB/s or less. In the case of FIG. 11, since the access speed of the access device 100B is 2 MB/s, the nonvolatile memory device 200 accepts this connection and rejects the connection by the access device 100C. In this case, since data amount realizing a recording speed 2.6 MB/s is 3 MB as shown in FIG. 3 in a case where the access device 100A requires an access speed of 2MB/s or more, data is written only in a memory management unit including a free area of 3 MB or more among the management units of the nonvolatile memory. When the access device 100B requires a connection at 2 MB/s, data is written only in a management unit including a free area of 4 MB among the memory management units in order to ensure a maximum speed 4 MB/s. In this case, data transferred from the access devices 100A and 100B are simultaneously written and the respective connections were realized at 2 MB/s.

In a case of using the NAND type flash memory as the nonvolatile memory 206, since a recording speed is decreased in recording data less than a physical block size, it is required to record a certain amount of data, for example, record data of a physical block size or more to maintain a certain recording speed. For this reason, a restriction of a unit data recording amount may be provided to the access device side 100. In this case, when the nonvolatile memory device 200 informs the access device 100 of access speed assurance availability, information showing, for example, that "the required unit data recording amount is 2 MB or more" may be added at S104 in FIG. 4. When receiving this response, the access device 100 generates data so that a total data amount to be transferred to the nonvolatile memory device 200 from start of data recording to its end can be a unit of 2 MB or more and records data to the nonvolatile memory device 200. Further, without adding information of the unit data recording amount as the response at S104, a predetermined size preliminarily determined between the access device 100 and the nonvolatile memory device 200 may be used as the unit data recording amount.

Figure 12:
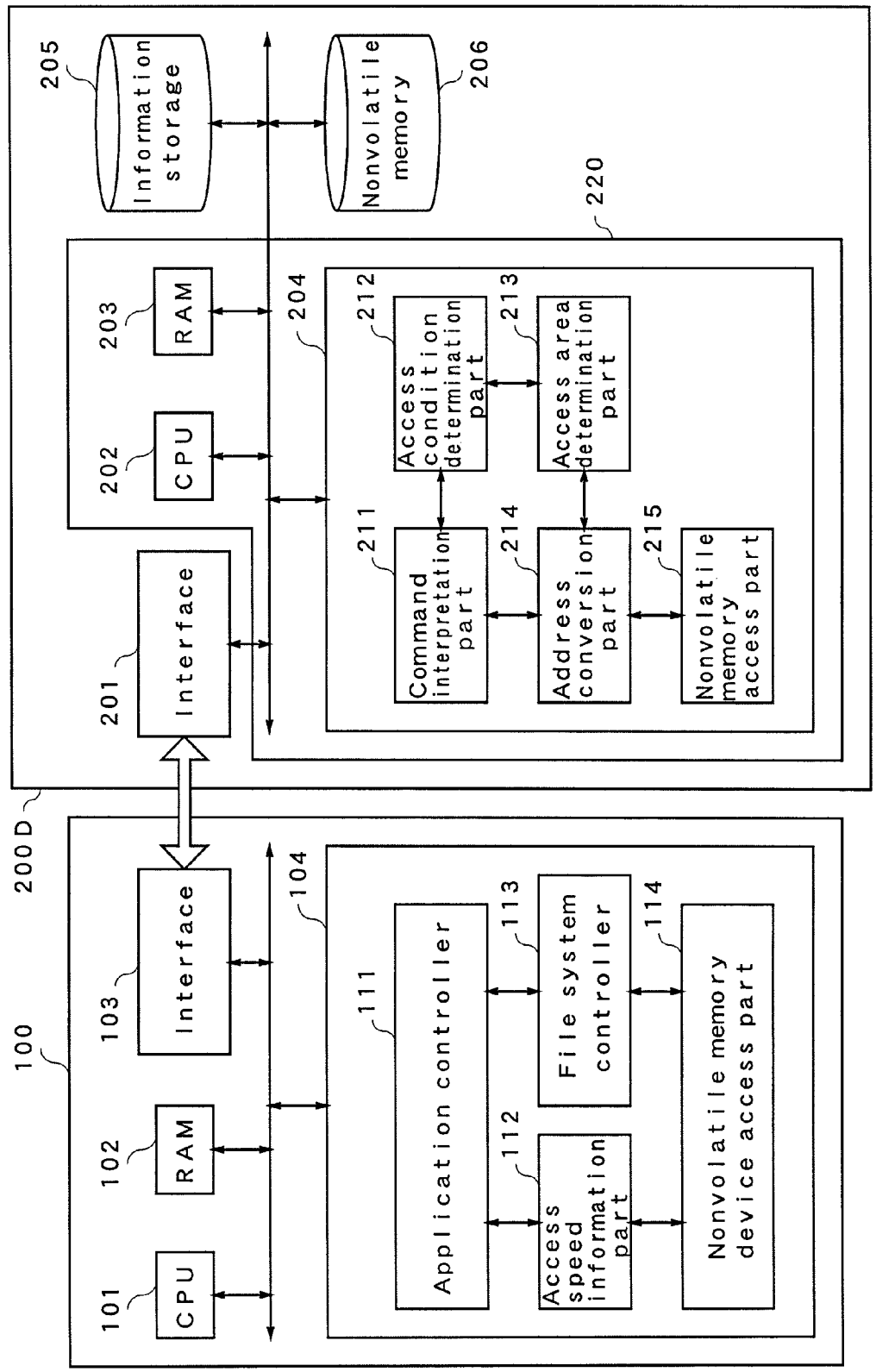
FIG. 12 is a flowchart showing one example of a connection assuring an access speed of the access device and nonvolatile memory device in embodiment 1 of the present invention.

FIG. 12 shows a modified example of embodiment 1. A CPU 202, RAM 203, and ROM 204 in a nonvolatile memory device 200D are not necessarily required to exist independently, and they may be included in an integrated memory controller 220 as shown in FIG. 12. On this occasion, the memory controller 220 is not necessarily required to include all the shown blocks, and may include only a part of them and may include other blocks such as the access device interface 201 in its inside.

(Embodiment 2)

Figure 13:
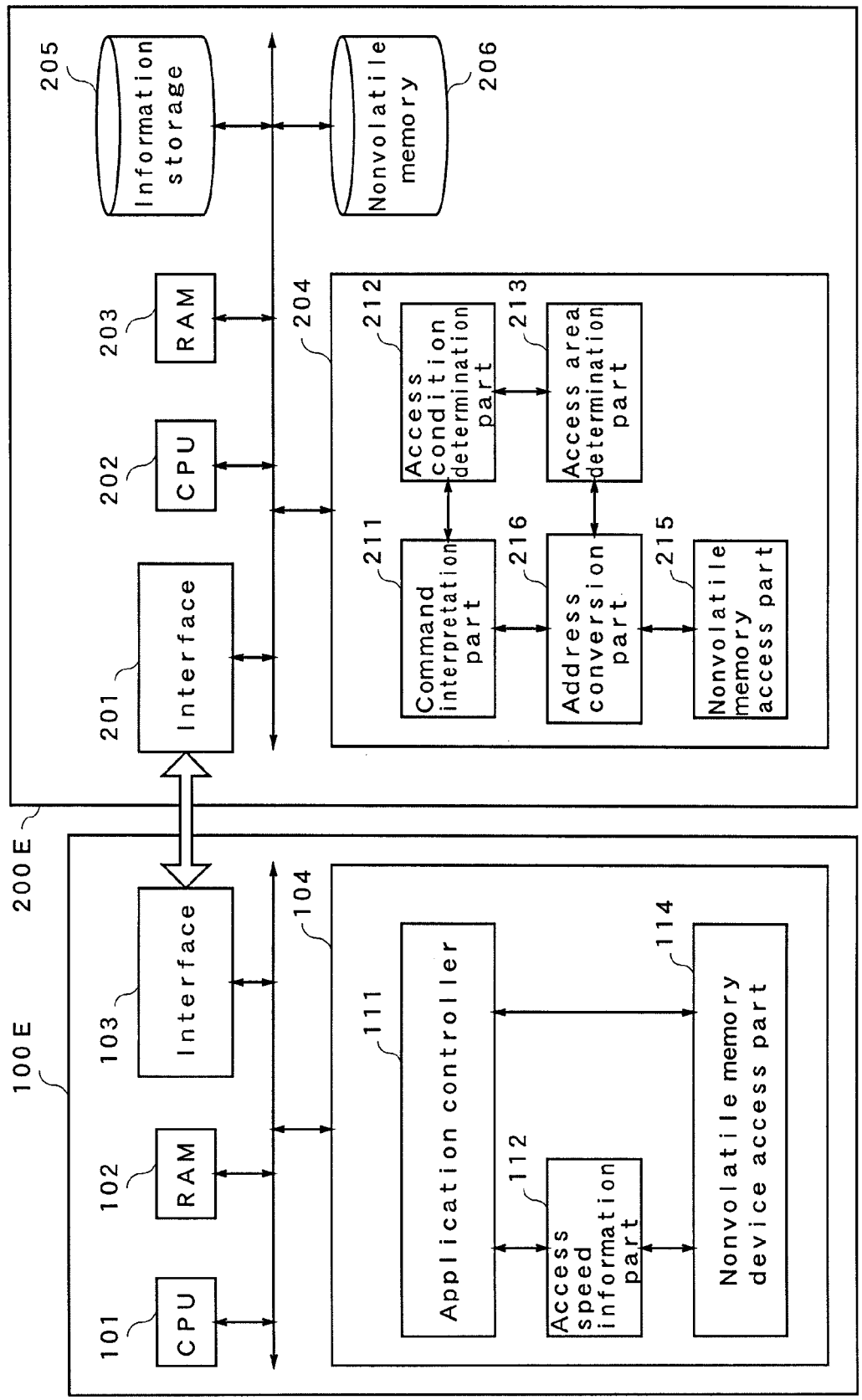
FIG. 13 is an explanation view for embodying an access device and nonvolatile memory device in embodiment 2 of the present invention.

FIG. 13 is a configuration view showing an access device and nonvolatile memory device in embodiment 2 of the present invention. A different point from embodiment 1 in the present embodiment is that the file system controller 113 does not exist in an access device 100E and that the address conversion controller 214 in the nonvolatile memory device 200E is replaced by a file system controller 216. The other points are the same as those of embodiment 1, and detailed descriptions will be omitted by adding the identical numerals to the identical components.

In embodiment 1 of the present invention, based on an access condition determined by the access condition determination part 212 in the nonvolatile memory device 200, the access area determination part 213 determines an area meeting the access condition on the nonvolatile memory 206 and records data. Embodiment 2 of the present invention matches a data arrangement with an access condition to realize assurance of an access speed by providing the file system controller 216 on the ROM 204 side of the nonvolatile memory device 200E. In this case, a function of the address conversion controller 214 is assumed to be included in the file system controller 216.

In the present embodiment, the access device 100E transfers access commands for opening, closing, reading, and writing of a file in units of files to the file system controller 216 of the nonvolatile memory device.

Figure 14:
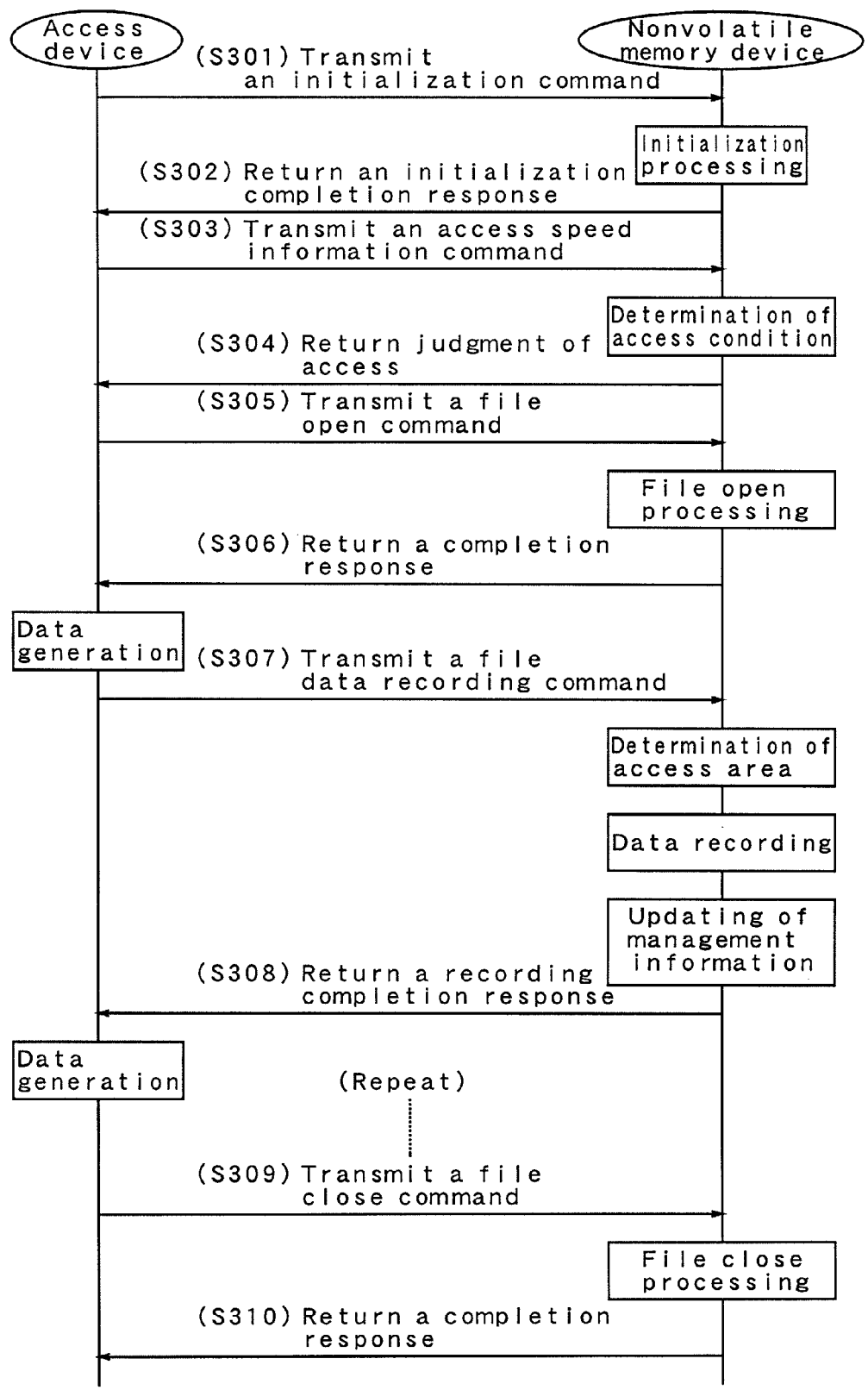
FIG. 14 is a flowchart showing an operational flow in data recording of the access device and nonvolatile memory device in embodiment 2 of the present invention.

A data recording flow in the present embodiment will be explained with using FIG. 14. Since processings from S301 to S304 are the same as those from S101 to S104 in data recording in the present embodiment, their explanation will be omitted. When initialization and access speed informing processing are completed, the access device 100 transfers a file opening command to the nonvolatile memory device 200 (S305). This is the same as a file opening command to the file system controller 113 conventionally mounted on the access device 100 side, and commands opening a file by specifying a file name and an open mode. The nonvolatile memory device 200 that received the file opening command performs processing for opening a file in the file system controller 216. This file system controller 216 performs the same processing as that of the file system controller 113 conventionally mounted on the access device 100 side. In a case of newly creating a file, the access device 100E specifies a file name and a newly creating operation, and commands opening a file. In this case, the file system controller 216 in the nonvolatile memory device 200E newly creates a file. In addition, the file system controller 216 generates information related to the opened file on the RAM 203 and generates an identifier for identifying the opened file. When the file opening is completed, the nonvolatile memory device 200E returns a response showing the completion of the file opening with the generated identifier to the access device 100E (S306).

Next, the access device 100E transfers a file data recording command to the nonvolatile memory device 200E after generating data to be recorded to the nonvolatile memory device 200E (S307). In this data recording command, data is transferred and, for example, a data size and an identifier of a file to which data is to be recorded are informed to the nonvolatile memory device 200E. The nonvolatile memory device 200E that received the file data recording command determines an address of an area where the access area determination part 213 actually records data after obtaining an access condition from the access condition determination part 212. An address management on the file system is realized uniformly by, for example, a file allocation table in a FAT file system. For this reason, the access area determination part 213 refers to the file allocation table, searches a free area meeting the access condition, and determines an address of an area where data is to be recorded. Then, data is actually recorded to a recording area on the nonvolatile memory 206 corresponding to the address. And, the file system controller 216 updates management information of the file system such as the file allocation table in order to manage the address where data is recorded this time as a used area. After completion of the series of these operations, the nonvolatile memory device 200E returns the completion of the file data recording to the access device 100 (S308). Then, the access device 100E side repeats processings from the data generation to S308 until recording of necessary data amount is completed.

Finally, the access device 100E transmits a file closing command to the nonvolatile memory device 200E (S309). This is the same as the file closing command to the file system controller 113 conventionally mounted on the access device 100E side. In this command, as for the file of the specified identifier, information concerning an opening state of a file generated on the RAM 203 is deleted and the file returns to an unopened state. Upon completion of closing the file, the nonvolatile memory device 200 returns a response showing the completion of the file closing processing to the access device 100 (S210).

As described above in embodiment 2 of the present invention, by preliminarily informing the nonvolatile memory device 200E of an access speed that the access device 100E requires, the nonvolatile memory device 200E can realize data recording meeting the access speed when recording data. In this data recording, the access area determination part 213 searches an area meeting the access condition, informs the file system controller 216 provided in the nonvolatile memory device 200 of the area, and records data as file data. By providing a processing part such as the access area determination part 213 for ensuring an access speed and providing the file system controller 216 to the nonvolatile memory device 200 side, the access device 100 is not required to record data in accordance with a particular access condition and is not required to control a particular file system. For that reason, data can be recorded at high speed, without installing a special file system on the access device side, into various nonvolatile memory devices 200 having different characteristics of a recording speed.

The present invention has been explained based on the above described embodiments, however, it is obvious that the invention is not limited to the above mentioned embodiments. The present embodiment can be changed without departing from the scope of the present invention. Various kinds of the modified examples explained in embodiment 1 of the present invention can be applied to embodiment 2.

Industrial Applicability

The access device and nonvolatile memory device according to the present invention realize data recording meeting an access speed preliminarily informed to the nonvolatile memory device in the data recording by preliminarily informing the nonvolatile memory device of the access speed that the access device requires. According to this, data can be recorded into the nonvolatile memory device at high speed, without installing a special file system on the access device side. This nonvolatile memory device can be used as a recording medium for storing digital contents such as music, a still image, and a movie, and the access device can be used as a PC application, an audio player, a DVD recorder, a HDD recorder, a movie camera, a digital TV, a digital still camera, a mobile phone terminal, and the like which access the nonvolatile memory device.

The invention claimed is:
1. A nonvolatile memory device, comprising:
a nonvolatile memory including a plurality of manager areas of a predetermined size, said nonvolatile memory storing data;
an access condition determiner that determines an access condition including a required minimum size of free area in a nonvolatile memory management unit calculated for a write access speed requested by an access device; and
an access area determiner that selects an area to record data in said nonvolatile memory based on said access condition determined by said access condition determiner and based on said write access speed required by the access device.

2. The nonvolatile memory device according to claim 1, wherein
said access area determiner determines a physical address of an area to record data based on said access condition, said device further comprising:
an address conversion controller for converting a logical address that shows a recording position in said nonvolatile memory device and that is provided by said access device into a physical address of said nonvolatile memory.

3. The nonvolatile memory device according to claim 1 further comprising:
a file system controller that manages data stored in said nonvolatile memory as a file, wherein
said access area determiner, based on said access condition, determines an area to record data in a recording area in said nonvolatile memory managed by said file system controller.

4. The nonvolatile memory device according to claim 1, wherein
said access condition includes a minimum data amount recorded in one unit of area management of said nonvolatile memory.

5. The nonvolatile memory device according to claim 1, wherein
said write access speed is a speed required by said access device when data is recorded to said nonvolatile memory device and is transmitted prior to data recording to said nonvolatile memory device.

6. The nonvolatile memory device according to claim 1, wherein
said write access speed is a flag indicating an access speed required when said access device accessing said nonvolatile memory device records data to said nonvolatile memory device, and said write access speed is transmitted from said access device to said nonvolatile memory device prior to data recording to said nonvolatile memory device.

7. The nonvolatile memory device according to claim 1, wherein
said write access speed is a time required for a single data recording when said access device accessing said nonvolatile memory device records data to said nonvolatile memory device, and is transmitted from said access device to said nonvolatile memory device prior to data recording to said nonvolatile memory device.

8. The nonvolatile memory device according to claim 1, wherein said nonvolatile memory device is connected to a plurality of access devices accessing said nonvolatile memory device, receives information concerning said write access speed from one access device among the plurality of access devices, and rejects an access request from said other access devices while continuing communication to said one access device.

9. The nonvolatile memory device according to claim 1, wherein
said nonvolatile memory device is connected to a plurality of access devices accessing said nonvolatile memory device, receives information concerning said write access speed from one access device among the plurality of access devices, and accepts communication with other access devices while continuing communication to said one access device by either one of handling an access request from said other access devices as data reading only and of not assuring the access speed.

10. The nonvolatile memory device according to claim 1, wherein
said nonvolatile memory device is connected to a plurality of access devices accessing said nonvolatile memory device and executes at least single data recording in parallel assuring said write access speed informed from the plurality of said access devices within a range of a maximum recording speed or less to said nonvolatile memory of said nonvolatile memory device.

11. The nonvolatile memory device according to claim 1, wherein
said access condition determiner adds a limitation that limits a unit of data transmitted and recorded to said nonvolatile memory device to at least a predetermined data size to said access device accessing said nonvolatile memory device.

12. The nonvolatile memory device according to claim 11, wherein
after said access device informs said nonvolatile memory device of said write access speed, said access device informs said nonvolatile memory device of said predetermined data size.

13. The nonvolatile memory device according to claim 1 further comprising:
an information storage that stores access characteristic information including a memory manager of said nonvolatile memory and a recording speed for recording data having a size less than that of the manager areas.

14. A nonvolatile memory system, comprising:
a nonvolatile memory device having a nonvolatile memory including a plurality of manager areas of a predetermined size and which stores data; and
an access device which accesses said nonvolatile memory device, wherein
said nonvolatile memory device includes:
the nonvolatile memory which has a plurality of management areas of a predetermined size and which stores data;
an access condition determiner that determines an access condition including a required minimum size of free area in a nonvolatile memory management unit calculated for a write access speed requested by the access device; and
an access area determiner that selects an area to record data in said nonvolatile memory based on said access condition determined by said access condition determiner and based on said write access speed required by the access device.

15. The nonvolatile memory system according to claim 14, wherein
said access area determiner of said nonvolatile memory device determines a physical address of an area recording data based on said access condition, further comprising:
an address conversion controller that converts a logical address that shows a recording position in said nonvolatile memory device and that is provided by said access device into a physical address of said nonvolatile memory.

16. The nonvolatile memory system according to claim 14, wherein
said nonvolatile memory device further comprises:
a file system controller that manages data stored in said nonvolatile memory as a file, and wherein
said access area determiner, based on said access condition, determines an area for recording data in a recording area in said nonvolatile memory managed by said file system controller.

* * * * *